United States Patent
Wei et al.

(10) Patent No.: US 12,513,224 B2
(45) Date of Patent: *Dec. 30, 2025

(54) PUSH GATEWAY FOR PLAYER DENSITY MAP GENERATION IN A MOBILE GAMING APPLICATION

(71) Applicant: Niantic, Inc., San Francisco, CA (US)

(72) Inventors: Mingliang Wei, San Jose, CA (US); Maoyang Li, Kirkland, WA (US); Michael Chang, Belmont, WA (US); Laura Tang, Seattle, WA (US)

(73) Assignee: Niantic, Inc., San Francisco, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/614,518

(22) Filed: Mar. 22, 2024

(65) Prior Publication Data
US 2025/0254226 A1    Aug. 7, 2025

Related U.S. Application Data

(63) Continuation of application No. 17/956,611, filed on Sep. 29, 2022, now Pat. No. 11,979,471.

(51) Int. Cl.
*H04L 67/55*    (2022.01)
*H04L 67/1008*    (2022.01)
*H04L 67/131*    (2022.01)

(52) U.S. Cl.
CPC .......... *H04L 67/55* (2022.05); *H04L 67/1008* (2013.01); *H04L 67/131* (2022.05)

(58) Field of Classification Search
CPC .... H04L 67/55; H04L 67/1008; H04L 67/131
See application file for complete search history.

(56) References Cited

U.S. PATENT DOCUMENTS

| 8,858,313 | B1 | 10/2014 | Selfors | |
|---|---|---|---|---|
| 10,154,370 | B2 * | 12/2018 | Hansen | G16H 40/63 |
| 2006/0168331 | A1 * | 7/2006 | Thompson | G06F 9/546 |
| | | | | 709/238 |

(Continued)

FOREIGN PATENT DOCUMENTS

WO    WO 2007/109047 A2    9/2007

*Primary Examiner* — Benjamin M Thieu
(74) *Attorney, Agent, or Firm* — Fenwick & West LLP

(57) ABSTRACT

A push gateway brokers messages between backend services and client devices connected to the gateway. The gateway includes a plurality of messaging frontend servers, a messaging database, and a plurality of topic servers. The messaging frontend servers manage the socket connections connecting the client devices to the push gateway. The messaging database is a key-value database that subscribes messaging frontend servers to topics. The topic servers receive publish requests from the backend servers to identify subscribed messaging frontend servers in the messaging database to push messages out to. The frontend messaging servers subsequently push out the message to the client devices subscribed to the topic. The gateway can aggregate player counts from a plurality of geographical regions based on the socket connections hosted by the messaging frontend servers. With the player counts, the gateway can generate a player density map, e.g., for socket load balancing, or for a gameplay feature.

20 Claims, 8 Drawing Sheets

(56) References Cited

U.S. PATENT DOCUMENTS

| | | | |
|---|---|---|---|
| 2007/0058681 A1* | 3/2007 | Bettis | H04L 47/38 |
| | | | 375/E7.198 |
| 2010/0306363 A1 | 12/2010 | Saputra et al. | |
| 2017/0251026 A1 | 8/2017 | Straub et al. | |
| 2019/0075178 A1 | 3/2019 | Onnen et al. | |

* cited by examiner

PUSH GATEWAY FOR PLAYER DENSITY MAP GENERATION IN A MOBILE GAMING APPLICATION

CROSS-REFERENCE TO RELATED APPLICATIONS

The present application is a continuation of U.S. application Ser. No. 17/956,611 filed on Sep. 29, 2022, which is incorporated by reference in its entirety.

BACKGROUND

1. Technical Field

The subject matter described relates generally to hosting an online mobile game via one or more servers.

2. Problem

In traditional systems, a game server operates in a stateful model with a universal game state that is pushed out to client devices connected to the game server. As actions are taken, the game server undergoes a laborious task to update the universal game state and provide periodic updates to the client devices. Traditionally, the client devices also periodically ping the game server for messages, causing redundant pings in situations when no message is queued up and creating inherent latency in receiving notifications.

SUMMARY

The present disclosure describes a push gateway capable of fast communication with client devices connected to the gateway. The gateway serves as a message broker between backend servers hosting services and the client devices. The gateway includes a plurality of messaging frontend servers, a messaging database, and a plurality of topic servers. The messaging frontend servers manage the socket connections connecting the client devices to the push gateway. The messaging frontend servers may further monitor the socket connections, collecting analytical data on the client devices and the connections. The messaging database is a key-value database that subscribes client devices to topics. The topic server receives publish requests from the backend servers to identify subscribed messaging frontend servers in the messaging database subscribed to the topics noted in the publish requests. The messaging frontend servers pull down the message from the messaging database and push out the message to client devices interested in the topic.

In some embodiments, the gateway includes a load balancer to distribute socket connections across the messaging frontend servers. The gateway can redistribute connections across the messaging frontend servers. When redistributing connections, the gateway generates and sends a reconnection notification to a client device with an option to send a reconnect request. The client device accepts the option to reconnect, thereby creating a new socket connection to the gateway.

In some embodiments, the gateway includes a density server that generates a density map showing player density. Each messaging frontend server manages a plurality of client devices and their socket connections to the gateway. The messaging frontend servers can monitor connectivity metrics including recording a player count per geographical region based on location of the client devices. The messaging frontend server can periodically publish the recorded player counts to the messaging database. The density server aggregates the player counts per geographical region, and can create the density map. The density map may be incorporated into gameplay or some other service. The density map can also inform load balancing by services across various servers.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining overlap between images is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Parallel-Reality Game System Overview

Figure 1:
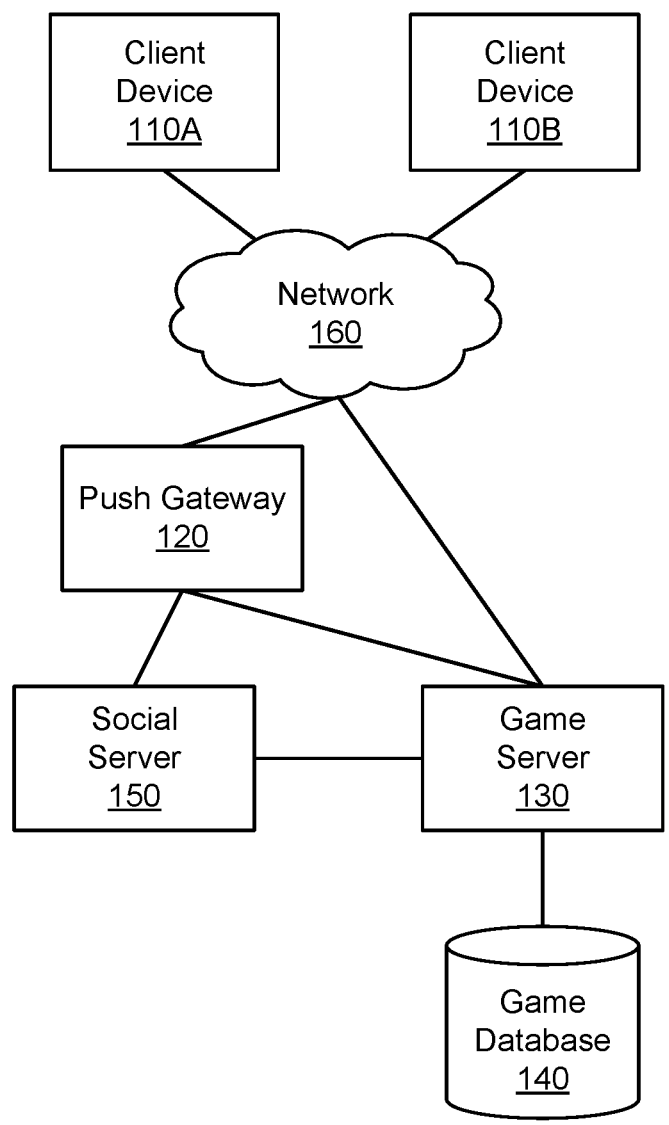
FIG. 1 is a block diagram of a networked computing environment suitable for hosting a parallel reality game, according to one or more embodiments.

FIG. 1 is a block diagram of a networked computing environment 100 suitable for hosting a parallel reality game, in which the disclosed box embedding techniques may be used, according to one embodiment. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

The networked computing environment 100 uses a client-server architecture, where one or more client devices 110 communicate with one or more backend servers via a push gateway 120 over a network 160 to provide a parallel reality game to players at the client device 110. The backend servers include at least a game server 130, which hosts the parallel-reality game, and may also include other servers such as a social server 150. The networked computing environment 100 also may include other external systems such as sponsor/advertiser systems or business systems. Although two client devices 110A & 110B are illustrated in FIG. 1, any number of client devices 110 (including just one client device 110) or other external systems may be connected to the game server 130 over the network 160.

A client device 110 can be any portable computing device that can be used by a player to interface with the game server 130. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 130. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet. Various embodiments of the client device 110 are described in greater detail below, with reference to FIG. 2.

In one or more embodiments, the client device 110 runs a mobile gaming application that connects to the push gateway 120 and the game server 130. The mobile gaming application can push and pull game states to update the local instance of the game on the client device 110. In one or more embodiments, the mobile gaming application connects to the push gateway 120 to subscribe to various messages that can be broadcast. In response to receiving one or more messages, the mobile gaming application may fetch messages directly from the backend servers, e.g., the game server 130 or the social server 150.

The push gateway 120 facilitates notifications from one or more backend servers to the one or more client devices 110. The push gateway 120 establishes socket connections with the client devices 110 and subscribes the client devices in a messaging database to one or more topics. When one of the backend servers sends out a message to a topic, the push gateway 120 identifies client devices 110 subscribed to the topic in the database, and pushes out the message to the client devices 110, e.g., as an in-game notification. In one or more embodiments, the push gateway 120 may monitor the client devices 110 subscribed to the database. Monitoring may include aggregating connection statistics and performing one or more actions based on the statistics. For example, the push gateway maps out locations of the client devices 110 to determine density of players in various geographical regions.

The game server 130 can be any computing device and can include one or more processors and one or more computer-readable storage media. The computer-readable storage media can store instructions which cause the processor to perform operations. In various embodiments, the game server 130 hosts a push gateway that is connected to the various client devices 110 of players playing the parallel reality game, such that all of the players interact with a consistent game world.

The game server 130 can be configured to receive requests for game data from a client device 110 (for instance via remote procedure calls (RPCs)) and to respond to those requests via the network 160. For instance, the game server 130 can encode game data in one or more data files and provide the data files to the client device 110. In addition, the game server 130 can be configured to receive game data (e.g., player positions, player actions, player input, etc.) from a client device 110 via the network 160. For instance, the client device 110 can be configured to periodically send player input and other updates to the game server 130, which the game server 130 uses to update game data in the game database 140 to reflect any and all changed conditions for the game. Various embodiments of the game server 130 are described in greater detail below, with reference to FIG. 4.

The game server 130 can include or can be in communication with a game database 140. The game database 140 stores game data used in the parallel reality game to be served or provided to the client devices 110 over the network 160. The game data stored in the game database 140 can include: (1) data associated with the virtual world in the parallel reality game (e.g., imagery data used to render the virtual world on a display device, geographic coordinates of locations in the virtual world, etc.); (2) data associated with players of the parallel reality game (e.g., player profiles including but not limited to player information, player experience level, player currency, current player positions in the virtual world/real world, player energy level, player preferences, team information, faction information, etc.); (3) data associated with game objectives (e.g., data associated with current game objectives, status of game objectives, past game objectives, future game objectives, desired game objectives, etc.); (4) data associated with virtual elements in the virtual world (e.g., positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g., location of real world objects/landmarks, description of real world objects/landmarks, relevance of virtual elements linked to real world objects, etc.); (6) Game status (e.g., current number of players, current status of game objectives, player leaderboard, etc.); (7) data associated with player actions/input (e.g., current player positions, past player positions, player moves, player input, player queries, player communications, etc.); and (8) any other data used, related to, or obtained during implementation of the parallel reality game. The game data stored in the game database 140 can be populated either offline or in real time by system administrators or by data received from users/players of the game, such as from a client device 110 over the network 160.

The social server 150 facilitates social interactions between players and their client devices 110. In one or more embodiments, the social server 150 maintains a social network where players can access other player profiles, post content accessible by other players, e.g., for viewing, commenting, resharing, etc., and/or send private communications to other players. The social server 150 may maintain its own database for storing of data related to the social network, e.g., content posted by players, player profiles, player interests, inter-player communications, etc.

The network 160 can be any type of communications network, such as a local area network (e.g., intranet), wide area network (e.g., Internet), or some combination thereof. The network can also include a direct connection between a client device 110 and the game server 130. In general, communication between the game server 130 and a client device 110 can be carried via a network interface using any type of wired or wireless connection, using a variety of communication protocols (e.g., TCP/IP, HTTP, SMTP, FTP), encodings or formats (e.g., HTML, XML, JSON), or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. Furthermore, the networked computing environment 100 may contain different or additional elements and functionality may be distributed between the client device 110, server 130, database 140, and image matching system 140 in a different manner than described.

In situations in which the systems and methods discussed herein access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Figure 2:
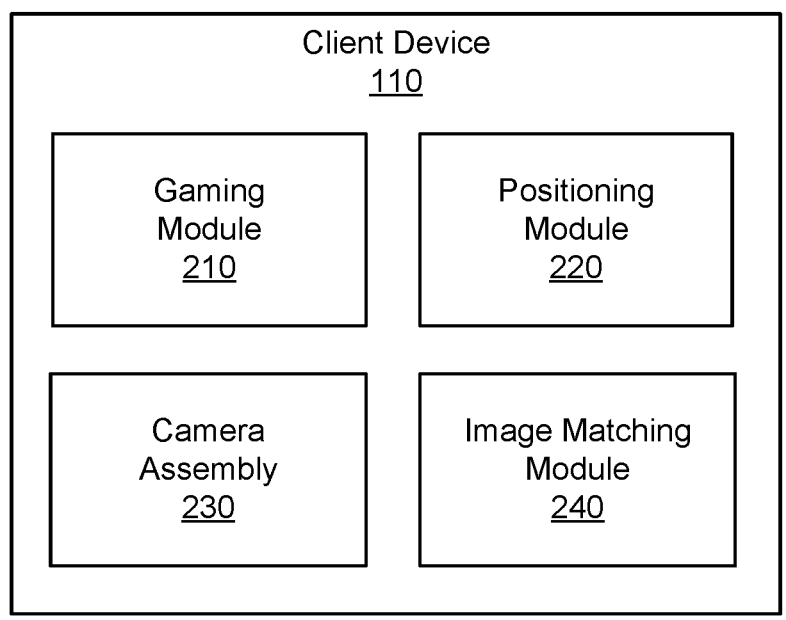
FIG. 2 is a block diagram of the client device of FIG. 1, according to one or more embodiments.

FIG. 2 is a block diagram of the client device 110 of FIG. 1, according to one embodiment. In the embodiment shown, the client device 110 includes a gaming module 210, a positioning module 220, and a camera assembly 230. In other embodiments, a client device 110 may include different or additional elements. Furthermore, the functionality may be distributed among the elements in different way than described.

The gaming module 210 provides a player with an interface to participate in the parallel reality game. The game server 130 transmits game data over the network 160 to the client device 110 for use by the gaming module 210 to provide local versions of the game to players at locations remote from the game server 130. In one embodiment, the gaming module 210 presents a user interface on a display device associated with the client device 110 that displays a virtual world (e.g., renders imagery of the virtual world) associated with the game and allows a user to interact in the virtual world to perform various game objectives. In some embodiments, the gaming module 210 presents image data from the real world (e.g., captured by the camera assembly 230) augmented with virtual elements from the parallel reality game. In these embodiments, the gaming module 210 may generate virtual content or adjust virtual content according to other information received from other components of the client device 110. For example, the gaming module 210 may adjust a virtual object to be displayed on the user interface according to a depth map of the scene captured in the image data (e.g., as generated by a depth estimation model).

The gaming module 210 can also control various other outputs to allow a player to interact with the game without requiring the player to view a display screen. For instance, the gaming module 210 can control various audio, vibratory, or other notifications that allow the player to play the game without looking at the display screen. The gaming module 210 can access game data received from the game server 130 to provide an accurate representation of the game to the user. The gaming module 210 can receive and process player input and provide updates to the game server 130 over the network 160. The gaming module 210 may also generate or adjust game content to be displayed by the client device 110. For example, the gaming module 210 may generate a virtual element based on depth information (e.g., as determined by a depth estimation model applied to one or more images captured by the camera assembly 230).

The gaming module 210 maintains communications with the game server 130 via the network 160. The gaming module 210 connects to the game server 130 via a socket connection provided by the game server 130. The socket connection is a communicative pathway that allows for the gaming module 210 to provide data to and to receive data from the game server 130. Example data provided to the game server 130 may include game actions taken by the player on the client device 110, images captured by the camera assembly 230, position data as determined by the positioning module 220, other data captured by one or more other components of the client device 110, etc. Example data received from the game server 130 may include game updates, actions taken by other players, game content, etc.

The positioning module 220 can be any device or circuitry for monitoring the position of the client device 110. For example, the positioning module 220 can determine actual or relative position by using a satellite navigation positioning system (e.g., a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 220 may further include various other sensors that may aid in accurately positioning the client device 110 location.

As the player moves around with the client device 110 in the real world, the positioning module 220 tracks the position of the player and provides the player position information to the gaming module 210. The gaming module 210 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 210 can provide player position information to the game server 130 over the network 160. In response, the game server 130 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g., to update player position in the virtual world). In addition, any location information associated with players will be stored and maintained in a manner to protect player privacy.

The camera assembly 230 includes one or more cameras configured to capture images of the physical environment in which the client device 110 is located. The portion of the physical environment depicted in an image is referred to as a scene. The camera assembly 230 captures image data corresponding to the scene and stores it in a storage medium of the client device. Additionally or alternatively, the image data may be sent to the game server 130 via the network 160. The camera assembly 230 may utilize a variety of varying photo sensors with varying color capture ranges at varying capture rates. The camera assembly 230 may contain a wide-angle lens or a telephoto lens. The camera assembly 230 may be configured to capture single images or video as the image data. The client device 110 may also include other sensors for recording data about the client device's physical environment, such as accelerometers, gyroscopes, inertial measurement units (IMUs), barometers, thermometers, light sensors, microphones, etc. The image data can be appended with metadata describing other details of the image data including sensory data (e.g., temperature, brightness of environment) or capture data (e.g., exposure, warmth, shutter speed, focal length, capture time, etc.).

The image matching module 240 receives images captured by the camera assembly 230 and conducts image matching on the images. In some embodiments, the image matching module 240 sends the captured images to the image matching system 140 for image matching. In other embodiments, the image matching module 240 performs image matching by using the method described above in conjunction with the image matching system 140.

In configurations where the client device 110 has two or more cameras, the image matching module 240 may also perform stereo matching to learn more information about the scene depicted in images captured by the cameras. In one embodiment, the image matching module 240 take a stereo pair of images and determines the per-pixel horizontal displacement (i.e., disparity) between pixels in the left image to the right image, or vice versa. Because the two images are captured by cameras of a single device, the cameras have known poses relative to each other. Alternatively, the stereo pair may be a pair of frames in a video captured by a single camera.

In various embodiments, the image matching module 240 applies a stereo matching model to generate a mapping indicating how the pixels of one image translate onto the pixels of the other image in the pair. This mapping may be used to provide augmented reality content. For example, for a client device 110 with two or more cameras that capture overlapping portions of a scene, the stereo matching model may be used to obtain a greater understanding of the portion(s) of scene captured by two or more cameras such that augmented reality content (e.g., an AR character) interacts with the scene in a more realistic manner. Furthermore, the client device 110 may include a depth estimation model (e.g., a machine learning model as used by the depth estimation module 510) for estimating the distance between the camera assembly 230 and the physical object corresponding to each pixel in an image.

Figure 3:
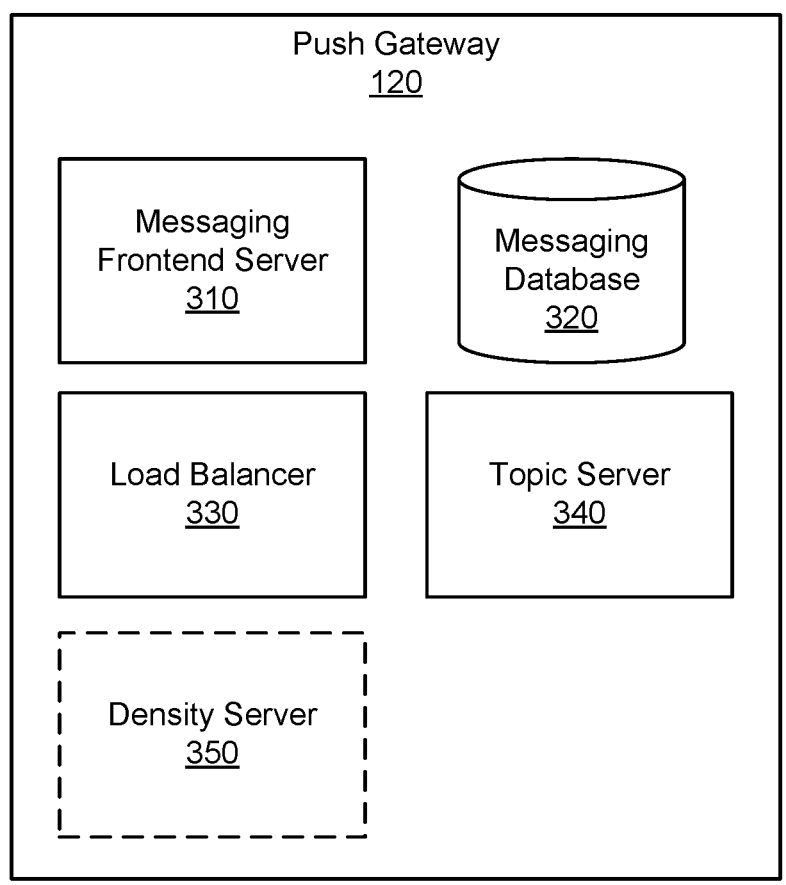
FIG. 3 is a block diagram of the push gateway of FIG. 1, according to one or more embodiments.

FIG. 3 is a block diagram of the push gateway 120 of FIG. 1, according to one embodiment. In the embodiment shown, the push gateway 120 includes a messaging frontend server 310, a messaging database 320, a load balancer 330, and a topic server 340. In some embodiments, the push gateway 120 further includes a density server 350. As mentioned above, the push gateway 120 pushes out notifications from backend servers to the client devices 110. In other embodiments, the game server 130 contains different or additional elements. In addition, the functions may be distributed among the elements in a different manner than described.

The messaging frontend server 310 receives connections requests from client devices 110. A client device 110 transmits a request to establish a socket connection between the client device 110 and the game server 130. On initial request to connect, the messaging frontend server 310 determine a plurality of topics that the client device 110 is interested in. Topics include broad topics applicable to all players and narrow topics for a subset of players. Example broad topics may include updates to the universal game, upcoming events, etc. One example of a narrow topic is based a geographical topic based on the location of the client device 110, such that the client device 110 is interested in messages pertaining to the geographical region. Other examples of narrow topics include topics based on one or more characteristics of the player and/or the client device 110. For example, the player is part of a team and may subscribe to updates pertaining to their team. In additional embodiments, the player, via the client device 110, may request to subscribe to a narrow topic. For example, the player is interested in receiving notifications relating to a game entity. Based on the determined plurality of topics for the client devices 110 hosted by a messaging frontend server 310, the messaging frontend server 310 subscribes to those topics with the messaging database 320.

The messaging frontend server 310 also communicates messages to the client devices 110. When the topic server 340 determines to send a message to the messaging database 320, the topic server 340 generates a publish request, labeling the message with one or more topics. The topic server 340 sends the publish request to the messaging database 320, which then provides the message to the any messaging frontend servers 310 subscribed to the one or more topics. The messaging frontend servers 310, that are subscribed to the one or more topics of the message, receive the message to distribute to their client devices 110. For example, a first messaging frontend server 310 has subscribed to a first topic. The topic server 340 sends out a message labeled with the first topic. The first messaging frontend server 310, being subscribed to the first topic, pulls down the message from the topic server 340. The first frontend messaging server 310 then delivers, e.g., through the socket connections, the message to one or more of its client devices 110 that are subscribed to the first topic. The messaging frontend server 310 may operate as a stateless model. In a stateless model, the server doesn't require constant synchronization with the universal game state (e.g., stored on the game database 140).

The messaging frontend server 310 may redistribute a socket connection, the load balancer 330 sends a request to the client device 110 to request reconnection. The client device 110 requests connection, and one of the messaging frontend servers 310 establish a new socket connection. With the new socket connection, the messaging frontend server 310 may resubscribe the client device 110 to various topics.

The messaging frontend server 310 may perform one or more authentication checks prior to establishing the socket connection. Example authentication checks include identifying the client device 110, crosschecking the identification of the client device 110, verifying the security of the socket connection, other types of authentication processes, etc.

The messaging frontend server 310 may collect client device analytical data. Data may include data relating to the client devices 110. For example, the messaging frontend server 310 may log the types of client devices 110 connecting to the push gateway 120. As another example, the messaging frontend server 310 may log location of the client devices 110, e.g., using GPS coordinates, Schneider 2 (s2) cells, etc. Other data may include data relating to messages pushed out from the push gateway 120. Example metrics include latency, ping, download speeds, upload speeds, other connectivity metrics, etc. The messaging frontend server 310 may publish the data to the messaging database 320.

The messaging database 320 stores subscriptions of messaging frontend servers 310 to particular topics. The messaging database 320 is an in-memory key-value database. The messaging database 320 may operate in a fire-and-forget mode that does not allow for messages to persist. In such mode, the messaging database 320 identifies any and all messaging frontend servers 310 subscribed to a topic, and pushes the message to the identified messaging frontend servers 310. If no messaging frontend server 310 is identified, the message is not pushed out.

The load balancer 330 manages distribution of the socket connections. In one or more embodiments, there are a plurality of messaging frontend servers 310 that manage the various socket connections. Each messaging frontend server 310 may manage a maximum number of socket connections. The load balancer 330 can distribute incoming socket connections based on a variety of conditions. An example condition includes health of the one or more servers. The load balancer 330 may monitor metrics on each of the servers. Example metrics include number of socket connections, one or more metrics for each socket connection (e.g., ping, loss, jitter, bandwidth, throughput, connection type, location), overall ping on the socket connections, overall loss on the socket connections, overall jitter on the socket connections, overall bandwidth on the socket connections, overall distribution of connection types (e.g., WiFi, cellular data, other wireless communication protocols, etc.), distribution of locations of the socket connections. The load balancer 330 may quantify the overall health of the server based on an aggregation of one or more metrics. For one example, the load balancer 350 can assess the health of all servers and redistribute socket connections to improve overall health of the servers. Based on the health, the load balancer 350 can distribute incoming socket connections from connecting client devices 110 to the various messaging frontend servers 310.

The topic server 340 generates messages based on publish requests from the backend servers (e.g., the game server 130 and/or the social server 150). A publish request comprises a topic and a message. The publish request may further identify a subset of client devices 110 to be recipients of the message. The topic aims to identify players to direct the message to. The message itself comprises content and/or information to be presented to the player via their client device 110. Types of messages that can be pushed out through the active socket connections include broadcast messages, group-tailored messages, authorized messages, or some combination thereof. Broadcast messages are directed to the broad topics, e.g., for pushing out to all client devices 110 subscribed to the push gateway 120. Broadcast messages may be utilized for updating all players of universal game state updates, game events, launches, etc. Group-tailored messages are directed to one or more narrow topics (e.g., a subset of players subscribed to those narrow topics). For example, there is an update for a particular team of players that is pushed out to that team of players. Authorized messages layer some security parameter to the messages. Example security parameters include restrictions based on geography, restrictions based on time of day, an expiration time of the notification, etc. The topic server 340 pushes out the message to the messaging database 320, which identifies the messaging frontend servers 310 subscribed to the one or more topics of the message. In some embodiments with publish requests identifying the recipients, the topic server 340 may provide the intended recipients along with the message to the messaging frontend servers 310. The messaging frontend servers 310 may then deliver the message to the intended recipients.

The density server 350 aggregates location data relating to the client devices 110 published onto the messaging database 320. The frontend messaging modules 310 may manage all the socket connections of the client devices 110. Each frontend messaging server 310 may periodically publish counts of socket connections for geographical regions, e.g., s2 cells. For example, one frontend messaging server 310 publishes that the frontend messaging server 310 is hosting 53 connections in a first s2 cell, 38 connections in a second adjacent s2 cell, etc. Another frontend messaging server 310 publishes that it was hosting 3 connections in the first s2 cell, 44 in the second s2 cell, etc. So on and so forth with other frontend messaging modules 310. The density server 350 aggregates the counts from all messaging frontend servers 310 to an aggregate count per geographical region, e.g., a first count for a first s2 cell, a second count for a second s2 cell, etc. The density server 350 can generate a density map with the aggregated counts. The density server 350 may provide the density map to the backend servers.

In one or more embodiments, the push gateway 120 (e.g., via the messaging frontend server 310) can collect the data from redistribution of socket connections across the servers to train a machine-learning model to optimize load balancing. In some embodiments, the machine-learning model can input a proposed distribution of the socket connections across the servers to predict an anticipated health of the servers based on the proposed distribution. The machine-learning model can predict improvements in health of one or more of the servers based on anticipated redistributions of socket connections. In such embodiments, the push gateway 120 can redistribute socket connections based on the predicted health. In other embodiments, the machine-learning model can input a current distribution of the socket connections and output an optimized distribution. The push gateway 120 can leverage the machine-learning model in optimizing load distribution of the socket connections among the servers.

In other embodiments, the load balancer 330 can redistribute the socket connections when servicing one or more of the servers. In such embodiments, there may be an anticipated servicing or restricting of a server. To maximize use, the load balancer 330 can begin redistributing socket connections ahead of the planned servicing. In some embodiments, the load balancer 330 can utilize the trained machine-learning model to determine an optimal distribution of the socket connections across remaining servers.

The push gateway 120 may optimize socket connection distribution across its servers while hosting a mobile game with real-time notifications. In some traditional systems, the client devices would need to frequently check in with the game server to receive updates on game events. Such frequent checks result in redundant checks where no updates are present. With the push gateway 120, notifications are pushed out to the client devices 110 instantaneously, without waiting for the client device 110 to ping the game server 130. The push gateway 120 minimizes redundant checks from the client devices 110 and improves the latency by sending messages soon after generation.

Figure 4:
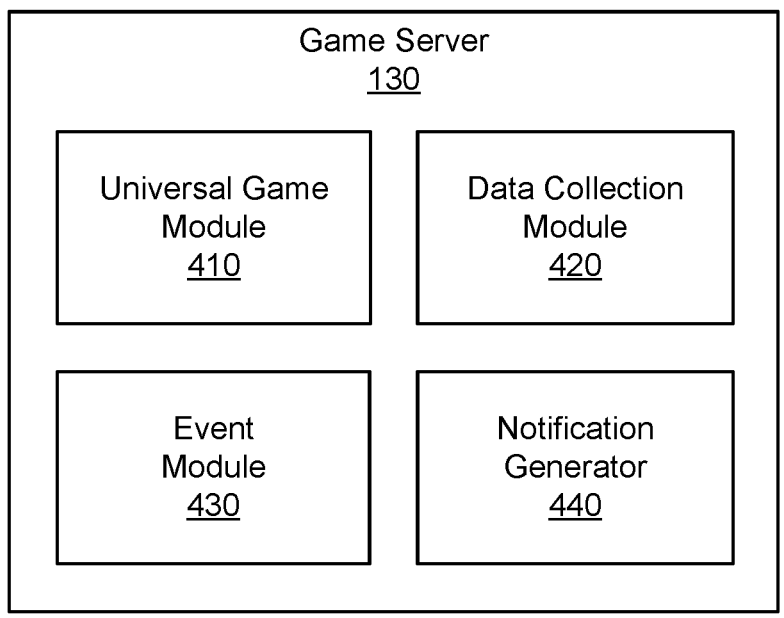
FIG. 4 is a block diagram of the game server of FIG. 1, according to one or more embodiments.

FIG. 4 is a block diagram of the game server 130 of FIG. 1, according to one embodiment. In the embodiment shown, the game server 130 includes a universal gaming module 410, a data collection module 420, and an event module 430. As mentioned above, the game server 130 interacts with a game database 140 that may be part of the game server 130 or accessed remotely (e.g., the game database 140 may be a distributed database accessed via the network 160). In other embodiments, the game server 130 contains different or additional elements. In addition, the functions may be distributed among the elements in a different manner than described. For instance, the game database 140 can be integrated into the game server 130.

The universal game module 410 hosts the parallel reality game for all players and acts as the authoritative source for the current status of the parallel reality game for all players. As the host, the universal game module 410 generates game content for presentation to players, e.g., via their respective client devices 110. The universal game module 410 may access the game database 140 to retrieve or store game data when hosting the parallel reality game. The universal game module 410 also receives game data from client device 110 (e.g., depth information, player input, player position, player actions, landmark information, etc.) and incorporates the game data received into the overall parallel reality game for all players of the parallel reality game. The universal game module 410 can also manage the delivery of game data to the client device 110 over the network 160. The universal game module 410 may also govern security aspects of client device 110 including but not limited to securing connections between the client device 110 and the game server 130, establishing connections between various client device 110, and verifying the location of the various client device 110.

The data collection module 420, in embodiments where one is included, can be separate from or a part of the universal game module 410. The data collection module 420 can manage the inclusion of various game features within the parallel reality game that are linked with a data collection activity in the real world. For instance, the data collection module 420 can modify game data stored in the game database 140 to include game features linked with data collection activity in the parallel reality game. The data collection module 420 can also analyze and data collected by players (e.g., as part of a crowd-sourcing effort) and provide the data for access by various platforms. To provide a specific example, players may be prompted to submit photographs of landmarks and other features of interest in their environment and the data collection module 420 may incorporate virtual elements corresponding to the real-world landmarks or features into the parallel reality game based on player submissions (e.g., subject to verifying that the landmark exists and is located where the submitting player indicated).

The event module 430 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The notification generator 440 may generate publish requests to push out to client devices 110. The notification generator 440 may generate a publish request including the message content and one or more topics to direct the message content. The notification generator 440 may generate various publish requests based on the other modules of the game server 130. In one or more embodiments, the notification generator 440 pushes the publish request to the topic server 340 of the push gateway 120 to push to the client devices 110.

Exemplary Push Gateway Methods

Figure 5:
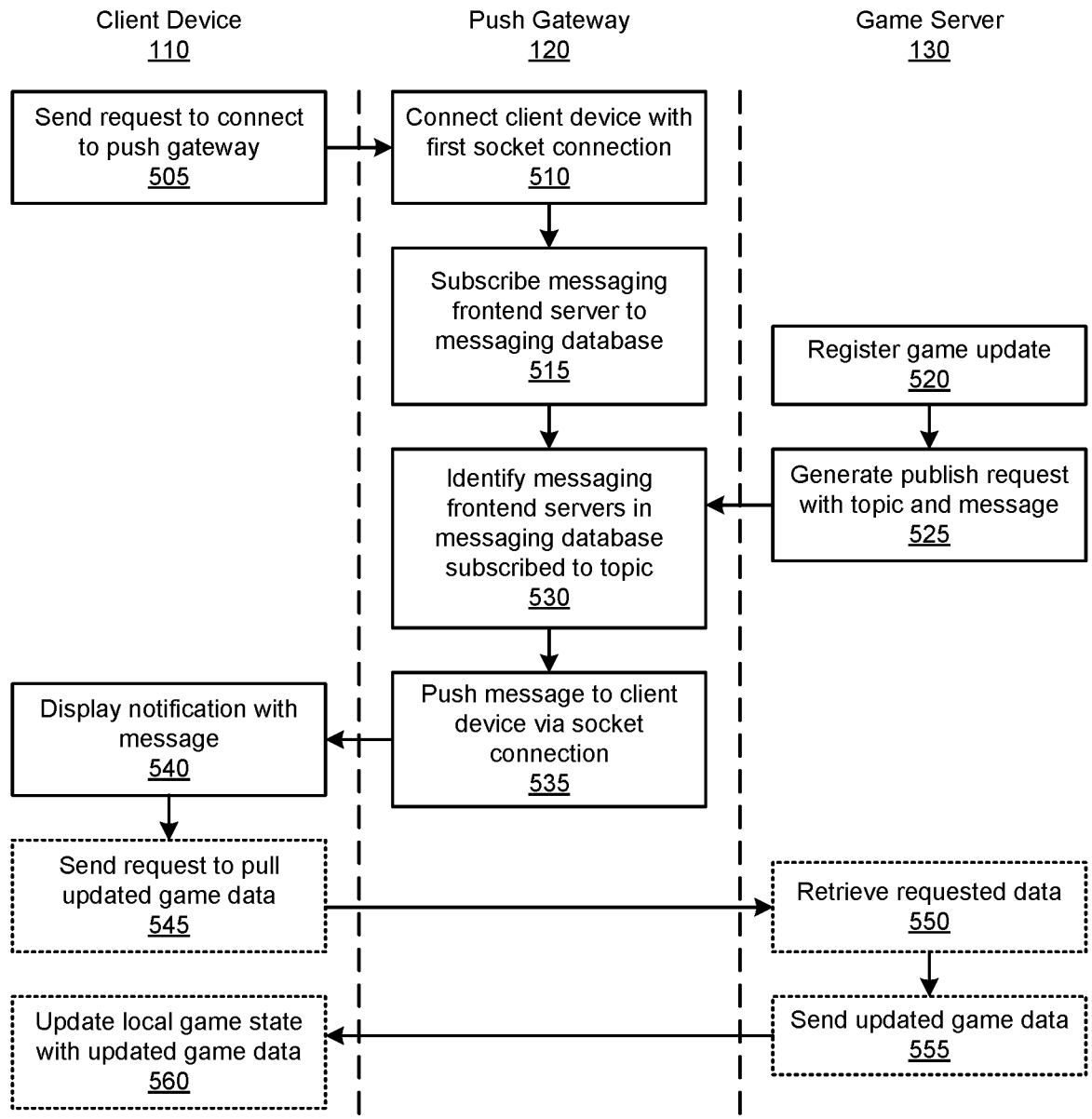
FIG. 5 depicts a flow diagram for providing notifications in a mobile game using a push gateway, in accordance with one or more embodiments.

FIG. 5 depicts a flow diagram for providing notifications in a mobile game using a push gateway 120, in accordance with one or more embodiments. The flow diagram illustrates various actions taken by the client device 110, the push gateway 120, and the game server 130. The same principles are scalable in embodiments with more than a single client device 110. The actions taken by the game server 130 can alternatively be performed by the social server 150.

The client device 110 sends 505 a request to connect to the push gateway 120. The request may include login information or other data identifying the player using the client device 110.

The push gateway 120 connects 510 the client device 110 with a first socket connection. In some embodiments, the push gateway 120 establishes the socket connection with a particular messaging frontend server 310. The messaging frontend server 310 determines the connected client device 110 is interested in one or more topics.

The push gateway 120 subscribes 515 the messaging frontend server 310 to the messaging database 320 of the push gateway 120. Based on the topics the client devices 110 are interested in, the messaging frontend server 310 subscribes to those various topics with the messaging database

320. The topics may include broad topics, e.g., to be broadcast to all players, and narrow topics, e.g., to be broadcast to a subset of players. The narrow topics may be based on the player, their client device 110, or a request by the player.

The game server 130 registers 520 a game update. The game update may include actions taken by users, update to the universal game state, release of game content, a universal game notification, result of a game event, other updates relating to the parallel-reality game, etc. Game actions taken by users may include, interacting with game elements, interacting with other players, utilizing inventory, etc.

The game server 130 generates 525 a publish request with topic and message. That publish request is sent to the push gateway 120.

The push gateway 120 identifies 530 messaging frontend servers 310 in the messaging database 320 subscribed to the topic in the publish request. In some embodiments, the publish request further specifies an intended recipient list, which the push gateway 120 uses to further refine the subscribers pulled for the topic.

The push gateway 120 pushes 535 the message to the client device 110 via the socket connection. The messaging frontend server 310 that receives or pulls down the message from the messaging database 320, identifies client devices 110 subscribed to the topic of the message. The messaging frontend server 310 pushes the message out to the identified client devices 110 subscribed to the topic of the message. The messaging frontend server 310 may format the message for the client device 110, e.g., based on the type of client device. In some embodiments, the message includes an option to request updated game data.

The client device 110 displays 540 a notification with the message received from the push gateway 120. The notification may be any of the various notification types. It can be a pop-up notification in a banner, a speech bubble from a game character, etc. The notification may be virtual elements to be provided to a player, updates on the game state, updates on other game events, messages from other players, etc.

In some embodiments, the client device 110 can send 545 a request, to the game server 130, to pull updated game data. In one or more embodiments, the notification includes an option for requesting the updated game data. For example, the message reads "Your friend Aiden has sent a message!" which, when clicked on by the player, sends the request to pull the private communication from the player's friend. Or as another example, the message reads "Thank you for participating, please collect your reward," which, when clicked on by the players, sends the request.

The game server 130, in response to the request from the client device 110, retrieves 550 the requested information. The game server 130 can retrieve the requested information from the game database 140, from another backend server, e.g., the social server 150. In some embodiments, the request is for an updated game state.

The game server 130 sends 555 the updated game data to the client device 110.

The client device 110, upon receipt of the updated game data, can update 560 a local game state with the updated game data. The local game state may be a local instance of the game running on the client device 110. The client device 110 may display the updated game state, e.g., via an electronic display.

Figure 6:
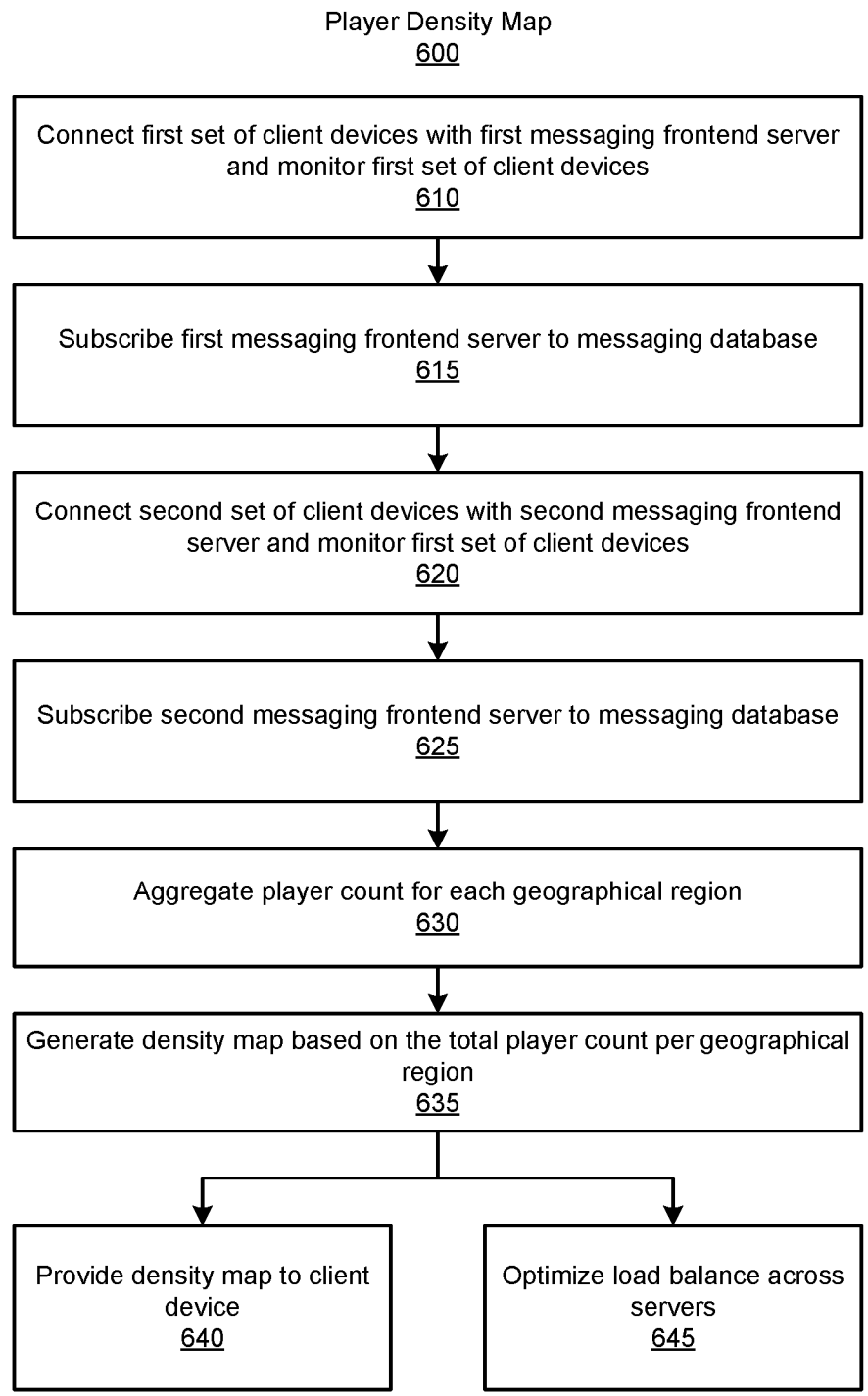
FIG. 6 depicts a flow diagram for generating a density map with the push gateway, in accordance with one or more embodiments.

FIG. 6 depicts a flow diagram for generating a density map with the push gateway 120, in accordance with one or more embodiments. The flow diagram illustrates various actions taken by the push gateway 120.

The push gateway 120 connects 610 a first set of client devices 110 with a first messaging frontend server 310 and monitors the first set of client devices 110. As client devices 110 request to connect to the parallel reality game, the push gateway 120 connect the first set of client devices 110 on a first set of socket connections. The push gateway 120 may utilize the load balancer 330 to distribute the client device 110 connection requests among the messaging frontend servers 310. The load balancer 330 may distribute to balance the load across the messaging frontend servers 310. In some embodiments, the load balancer 330 may monitor health of the messaging frontend servers 310 to determine the distribution. In one or more embodiments, the first messaging frontend server 310 counts a number of connections of client devices in each of a plurality of geographical regions, e.g., s2 cells. As the first messaging frontend server 310 establishes a new connection and receives a location of the client device 110, the first messaging frontend server 310 can update a count in each of the plurality of geographical regions.

The push gateway 120 subscribes 615 the first messaging frontend server 310 to the messaging database 320. The first messaging frontend server 310 subscribes to a plurality of topics in the messaging database 320 that the first set of client devices 110 is interested in. The first messaging frontend server 310 may track or log analytical data from the first set of client devices 110. The first messaging frontend server 310 publishes the count of connections in the plurality of geographical regions to the messaging database 320.

The push gateway 120 connects 620 a second set of client devices 110 to a second messaging frontend server 310 and monitors the second set of client devices 110. As with the first messaging frontend server 310, a load balancer 330 may help in distributing client devices 110 for connection by the messaging frontend servers. In one or more embodiments, the second messaging frontend server 310 counts a number of connections of client devices in each of the plurality of geographical regions, e.g., s2 cells.

The push gateway 120 subscribes 625 the second messaging frontend server 310 to the messaging database 320. The second messaging frontend server 310 subscribes to a plurality of topics in the messaging database 320 that the second set of client devices 110 is interested in. The second messaging frontend server 310 may track or log analytical data from the second set of client devices 110. The second messaging frontend server 310 also publishes the count of connections in the plurality of geographical regions to the messaging database 320. In other embodiments, there may be any number of messaging frontend servers 310 hosting any number of client devices 110.

The push gateway 120 aggregates 630 player count for each geographical region, e.g., via the density server 350. As each messaging frontend server 310 publishes counts of connections per geographical region to the messaging database 320, the density server 350 aggregates the counts to determine a total count of players per geographical region.

The push gateway 120 generates 635 a density map of the players based on the total player count per the geographical region.

The push gateway 120 may provide 640 the density map to display. Providing the density map to a player via the client device 110. Such feature may be incorporated into the gameplay of the parallel-reality game. For example, perhaps an event between two teams looks at player count in a geographical region. The team with the most players having traveled through a geographical region wins a reward. The density map can be used in determining which team is ahead in the competition. Showing the density map can notify a user of the current state of the competition.

The push gateway 120 may optimize 645 the load balance across the servers. In one or more embodiments, the load balancer 330 can redistribute the socket connections across the messaging frontend servers 310 based on the density map. The density map may inform load balancing across various services of the various servers (e.g., the game server 130, the social server 150, etc.).

Exemplary Parallel-Reality Game

Figure 7:
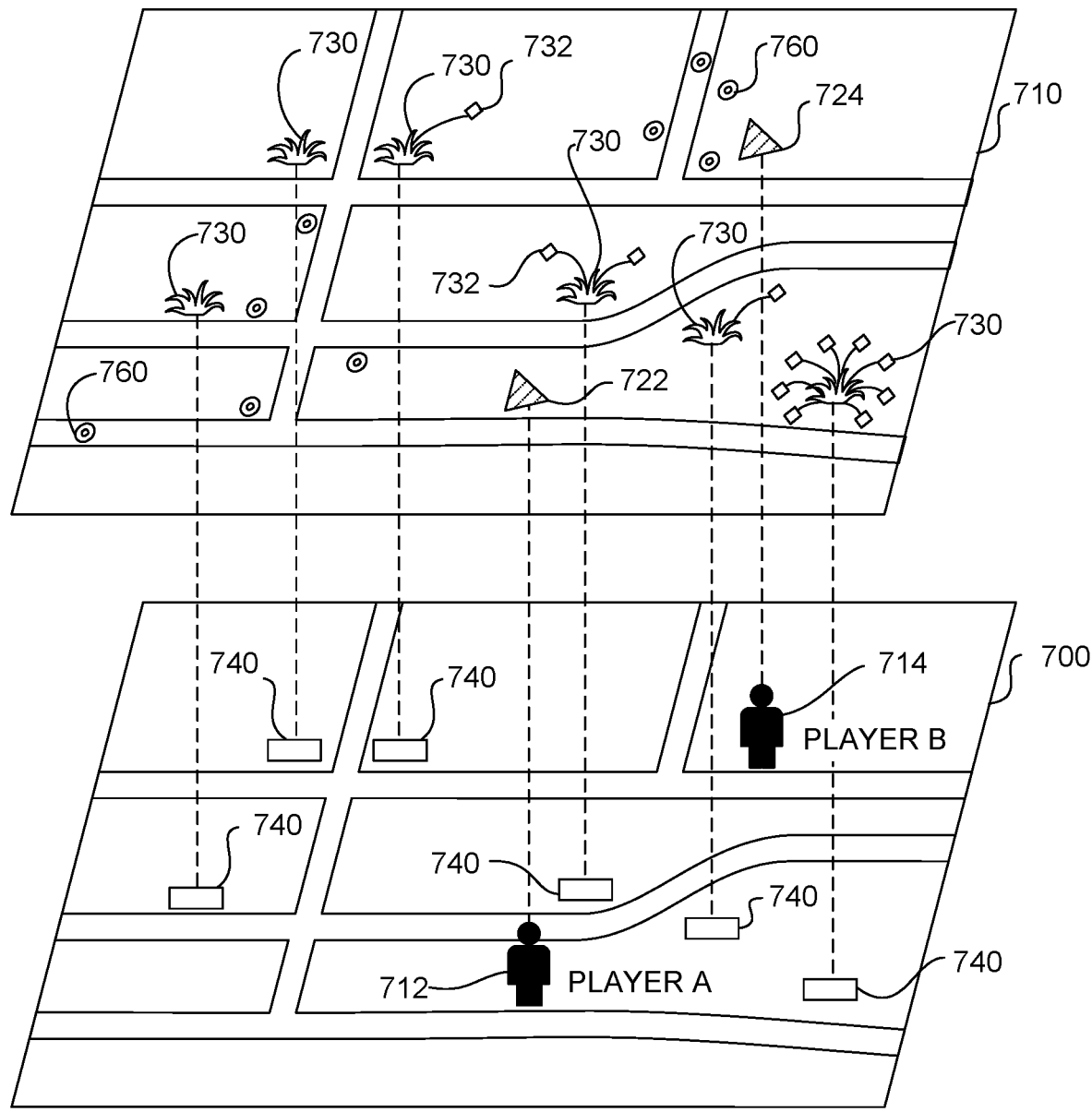
FIG. 7 depicts a conceptual diagram of a virtual world that parallels the real world that can act as the game board for players of a parallel reality game, according to one or more embodiments.

FIG. 7 depicts a conceptual diagram of a virtual world 710 that parallels the real world 700 that can act as the game board for players of a parallel reality game, according to one or more embodiments. As illustrated, the virtual world 710 can include a geography that parallels the geography of the real world 700. In particular, a range of coordinates defining a geographic area or space in the real world 700 is mapped to a corresponding range of coordinates defining a virtual space in the virtual world 710. The range of coordinates in the real world 700 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 710 corresponds to the player's position in the real world 700. For instance, the player A located at position 712 in the real world 700 has a corresponding position 722 in the virtual world 710. Similarly, the player B located at position 714 in the real world has a corresponding position 724 in the virtual world. As the players move about in a range of geographic coordinates in the real world, the players also move about in the range of coordinates defining the virtual space in the virtual world 710. In particular, a positioning system (e.g., a GPS system) associated with a mobile computing device carried by the player can be used to track a player's position as the player navigates the range of geographic coordinates in the real world. Data associated with the player's position in the real world 700 is used to update the player's position in the corresponding range of coordinates defining the virtual space in the virtual world 710. In this manner, players can navigate along a continuous track in the range of coordinates defining the virtual space in the virtual world 710 by simply traveling among the corresponding range of geographic coordinates in the real world 700 without having to check in or periodically update location information at specific discrete locations in the real world 700.

The location-based game can include a plurality of game objectives requiring players to travel to or interact with various virtual elements or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective has players interacting with virtual elements 730 located at various virtual locations in the virtual world 710. These virtual elements 730 can be linked to landmarks, geographic locations, or objects 740 in the real world 700. The real-world landmarks or objects 740 can be works of art, monuments, buildings, businesses, libraries, museums, or other suitable real-world landmarks or objects. Interactions include capturing, claiming ownership of, using some virtual item, spending some virtual currency, etc. To capture these virtual elements 730, a player must travel to the landmark or geographic location 740 linked to the virtual elements 730 in the real world and must perform any necessary interactions with the virtual elements 730 in the virtual world 710. For example, player A may have to travel to a landmark 740 in the real world 700 in order to interact with or capture a virtual element 730 linked with that particular landmark 740. The interaction with the virtual element 730 can require action in the real world, such as taking a photograph or verifying, obtaining, or capturing other information about the landmark or object 740 associated with the virtual element 730.

Game objectives may require that players use one or more virtual items that are collected by the players in the location-based game. For instance, the players may travel the virtual world 710 seeking virtual items (e.g., weapons, creatures, power ups, or other items) that can be useful for completing game objectives. These virtual items can be found or collected by traveling to different locations in the real world 700 or by completing various actions in either the virtual world 710 or the real world 700. In the example shown in FIG. 7, a player uses virtual items 732 to capture one or more virtual elements 730. In particular, a player can deploy virtual items 732 at locations in the virtual world 710 proximate or within the virtual elements 730. Deploying one or more virtual items 732 in this manner can result in the capture of the virtual element 730 for the particular player or for the team/faction of the particular player.

In one particular implementation, a player may have to gather virtual energy as part of the parallel reality game. As depicted in FIG. 7, virtual energy 760 can be scattered at different locations in the virtual world 710. A player can collect the virtual energy 760 by traveling to the corresponding location of the virtual energy 760 in the actual world 700. The virtual energy 760 can be used to power virtual items or to perform various game objectives in the game. A player that loses all virtual energy 760 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Example Computing System

Figure 8:
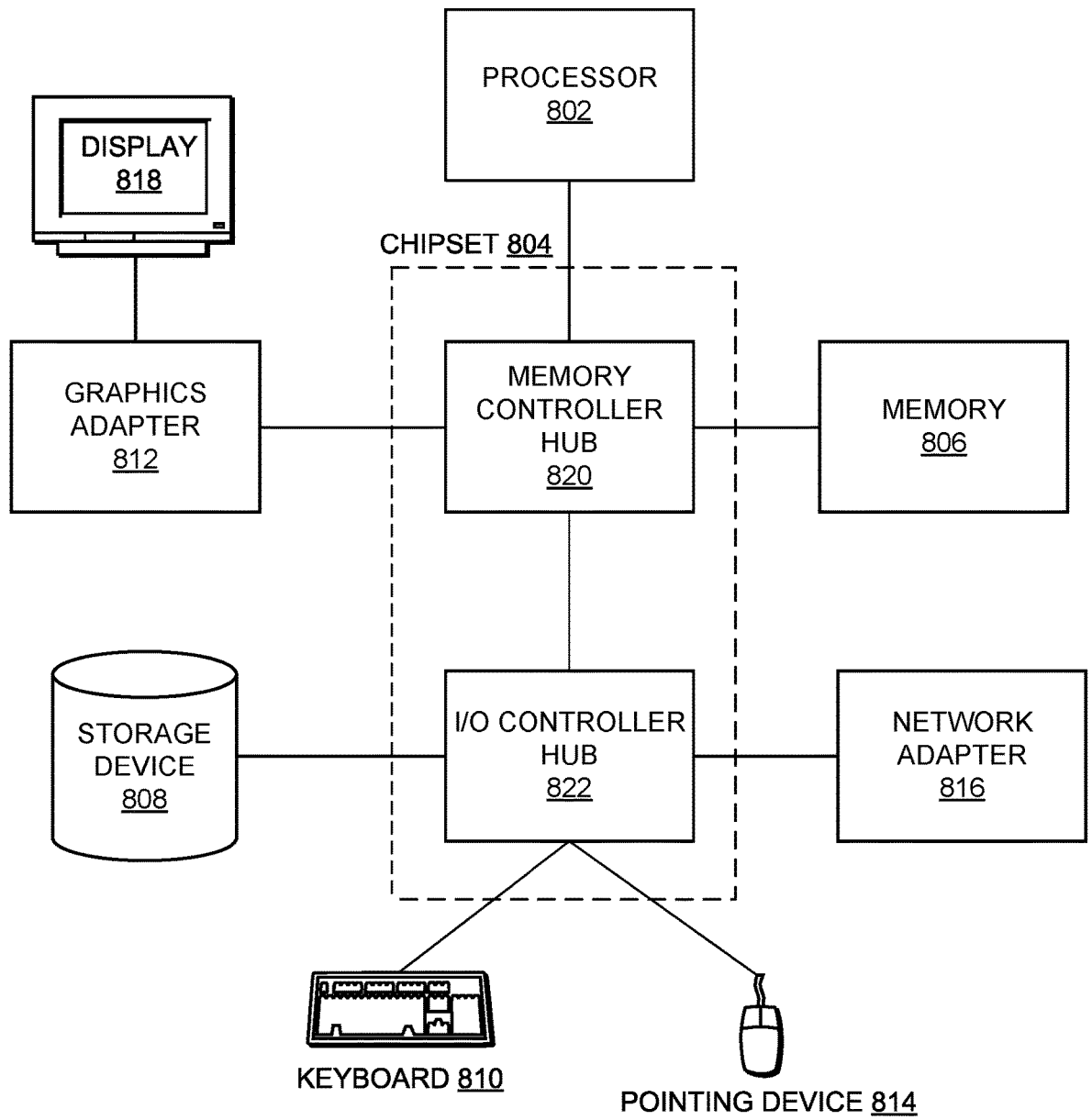
FIG. 8 is a high-level block diagram illustrating a functional view of a typical computer system, according to one or more embodiments.

FIG. 8 is a high-level block diagram illustrating a functional view of a typical computer system 800 for use as the image matching system 500 of FIG. 5 according to an embodiment. Although FIG. 8 depicts a high-level block diagram illustrating physical components of a computer used as part or all of one or more entities described herein, in accordance with an embodiment, a computer may have additional, less, or variations of the components provided in FIG. 8. Although FIG. 8 depicts a computer 800, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 8 are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In some embodiments, the computer 800 includes one or more communication buses for interconnecting these components. The one or more communication buses optionally include circuitry (sometimes called a chipset) that interconnects and controls communications between system components.

The storage device 808 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 808 can also be referred to as persistent memory. The pointing device 814 may be a mouse, track ball, or other type of pointing device, and is used in combination with the keyboard 810 to input data into the computer 800. The graphics adapter 812 displays images and other information on the display 818. The network adapter 816 couples the computer 800 to a local or wide area network.

The memory 806 holds instructions and data used by the processor 802. The memory 806 can be non-persistent memory, examples of which include high-speed random access memory, such as DRAM, SRAM, DDR RAM, ROM, EEPROM, flash memory.

As is known in the art, a computer 800 can have different or other components than those shown in FIG. 13. In addition, the computer 800 can lack certain illustrated components. In one embodiment, a computer 800 acting as a server may lack a keyboard 810, pointing device 814, graphics adapter 812, or display 818. Moreover, the storage device 808 can be local or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 808, loaded into the memory 806, and executed by the processor 802.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method comprising:
receiving, from each of a plurality of client devices, a request to establish a connection to a mobile game;
establishing, in response to each request, a socket connection for the corresponding client device on one of a plurality of messaging frontend servers;
subscribing each messaging frontend server to a set of one or more topics on a messaging database based on topic interests of the corresponding client devices connected to the messaging frontend server;
receiving, from each messaging frontend server, a count of socket connections;
aggregating player count for each of a plurality of geographical regions based on the counts of socket connections received from the messaging frontend servers;
generating a density map based on the player counts of the plurality of geographical regions; and
redistributing one or more of the socket connections based on the density map.

2. The computer-implemented method of claim 1, wherein receiving, from each messaging frontend server, the count of socket connections comprises receiving a subcount for each of a subset of geographical regions where corresponding client devices are located.

3. The computer-implemented method of claim 2, wherein aggregating the player count for each geographical region comprises:
identifying one or more messaging frontend servers hosting at least one socket connection in the geographical region; and
determining the player count for the geographical region by summing the one or more subcounts for the geographical region of the one or more identified messaging frontend servers.

4. The computer-implemented method of claim 1, wherein the plurality of geographical regions includes hierarchical tiling of cells.

5. The computer-implemented method of claim 4, wherein the plurality of geographical regions is subdivided using s2 geometry.

6. The computer-implemented method of claim 1, wherein redistributing the socket connections based on the density map comprises:
applying a machine-learning model to the density map to determine an optimal distribution of socket connections that maximizes health of the messaging frontend servers; and
redistributing the socket connections based on the optimal distribution.

7. The computer-implemented method of claim 1, wherein redistributing the socket connections based on the density map comprises:
identifying a first messaging frontend server to service;
determining an optimal distribution of the connections hosted by the first messaging frontend server to other messaging frontend servers based on the density map; and
redistributing the socket connections for the client devices hosted by the first messaging frontend server based on the optimal distribution.

8. The computer-implemented method of claim 1, wherein redistributing the socket connections based on the density map comprises, for each client device with a socket connection to be redistributed:
pushing a notification to the client device to reconnect to the mobile game;
receiving, from the client device, a subsequent request to establish a connection to the mobile game; and
establishing a new socket connection for the client device on another messaging frontend server.

9. A computer-implemented method comprising:
receiving, from each of a plurality of client devices, a request to establish a connection to a mobile game;
establishing, in response to each request, a socket connection for the corresponding client device on one of a plurality of messaging frontend servers;
subscribing each messaging frontend server to a set of one or more topics on a messaging database based on topic interests of the corresponding client devices connected to the messaging frontend server;
receiving, from each messaging frontend server, a count of socket connections;
aggregating player count for each of a plurality of geographical regions based on the counts of socket connections received from the messaging frontend servers;
generating a density map based on the player counts of the plurality of geographical regions; and
displaying one or more game elements of the mobile game based on the density map.

10. The computer-implemented method of claim 9, wherein receiving, from each messaging frontend server, the count of socket connections comprises receiving a subcount for each of a subset of geographical regions where corresponding client devices are located.

11. The computer-implemented method of claim 10, wherein aggregating the player count for each geographical region comprises:
identifying one or more messaging frontend servers hosting at least one socket connection in the geographical region; and
determining the player count for the geographical region by summing the one or more subcounts for the geographical region of the one or more identified messaging frontend servers.

12. The computer-implemented method of claim 9, wherein the plurality of geographical regions includes hierarchical tiling of cells.

13. The computer-implemented method of claim 12, wherein the plurality of geographical regions is subdivided using s2 geometry.

14. The computer-implemented method of claim 9, wherein displaying the game elements of the mobile game based on the density map comprises:
determining a state of an in-game competition between a plurality of teams based on the density map; and
displaying the one or more game elements reflecting the state of the in-game competition.

15. The computer-implemented method of claim 14, wherein displaying the game elements of the mobile game based on the density map comprises displaying the density map.

16. The computer-implemented method of claim 9, wherein displaying the game elements of the mobile game based on the density map comprises:

determining placement of the one or more game elements based on the density map; and displaying the game elements of the mobile game to client devices located in proximity to the game elements.

17. A non-transitory computer-readable storage medium storing instructions that, when executed by a processor, cause the processor to perform operations comprising:
receiving, from each of a plurality of client devices, a request to establish a connection to a mobile game;
establishing, in response to each request, a socket connection for the corresponding client device on one of a plurality of messaging frontend servers;
subscribing each messaging frontend server to a set of one or more topics on a messaging database based on topic interests of the corresponding client devices connected to the messaging frontend server;
receiving, from each messaging frontend server, a count of socket connections;
aggregating player count for each of a plurality of geographical regions based on the counts of socket connections received from the messaging frontend servers;
generating a density map based on the player counts of the plurality of geographical regions; and
redistributing one or more of the socket connections based on the density map.

18. The non-transitory computer-readable storage medium of claim 17, wherein receiving, from each messaging frontend server, the count of socket connections comprises receiving a subcount for each of a subset of geographical regions where corresponding client devices are located.

19. The non-transitory computer-readable storage medium of claim 18,
wherein aggregating the player count for each geographical region comprises:
identifying one or more messaging frontend servers hosting at least one socket connection in the geographical region; and
determining the player count for the geographical region by summing the one or more subcounts for the geographical region of the one or more identified messaging frontend servers.

20. The non-transitory computer-readable storage medium of claim 17, wherein redistributing the socket connections based on the density map comprises:
applying a machine-learning model to the density map to determine an optimal distribution of socket connections that maximizes health of the messaging frontend servers; and
redistributing the socket connections based on the optimal distribution.

* * * * *